April 29, 1969

J. G. CARDWELL, JR 3,441,772

FILAMENT MOUNT STRUCTURE FOR ELECTRIC LAMPS
AND MANUFACTURE THEREOF

Filed May 12, 1967

Inventor:
John G. Cardwell, Jr.
by Otto Tichy
His Attorney

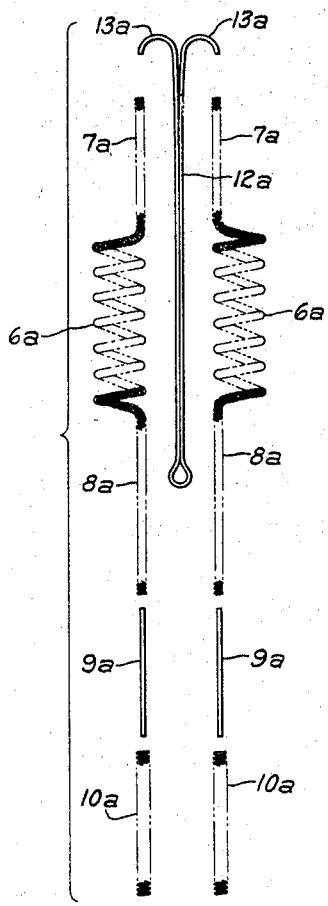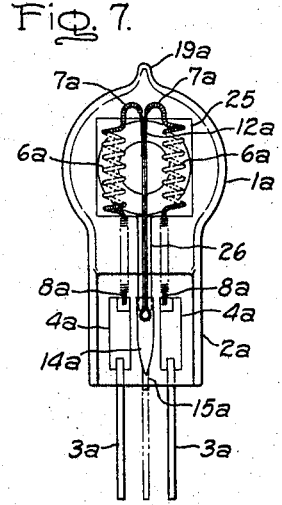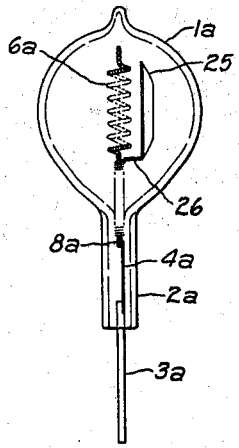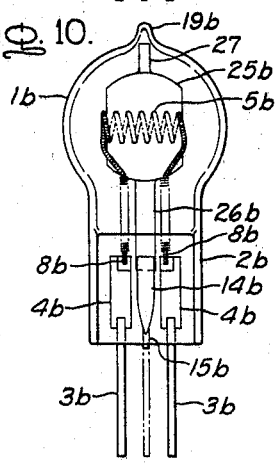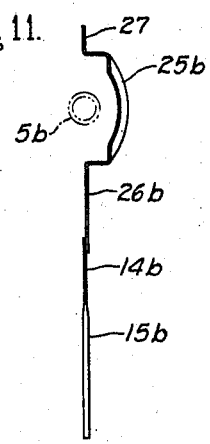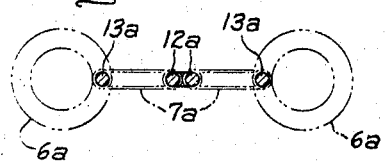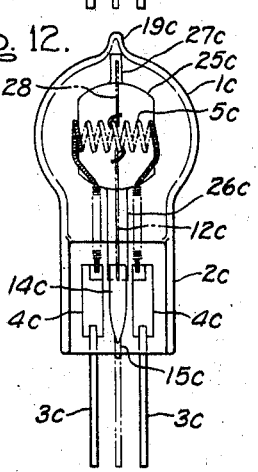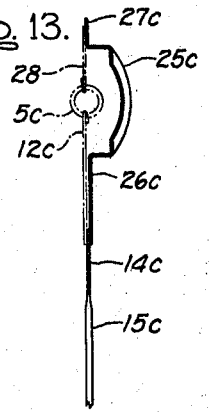

United States Patent Office 3,441,772
Patented Apr. 29, 1969

3,441,772
FILAMENT MOUNT STRUCTURE FOR ELECTRIC
LAMPS AND MANUFACTURE THEREOF
John G. Cardwell, Jr., Kirtland, Ohio, assignor to General
Electric Company, a corporation of New York
Filed May 12, 1967, Ser. No. 637,955
Int. Cl. H01k 3/20; H01j 19/48
U.S. Cl. 313—113
8 Claims

ABSTRACT OF THE DISCLOSURE

In a single-ended pinch seal lamp comprising a bulb of fused silica having a pinch seal at one end with a pair of parallel lead wires sealed therethrough and including thin foil portions hermetically sealed in the pinch and electrically connected to the ends of a coiled filament in the bulb which may also contain a metal reflector adjacent to the filament, a support wire member which includes a thin foil section is provided between the lead wires and includes a portion which extends into supporting relation to a portion of the filament or to the reflector or both so that, during assembly of the lamp, the support wire member is securely held in position, together with the lead wires, while the pinch seal is formed to hermetically seal all the foil sections and to embed adjacent portions of the lead wires and support wire member therein, after which the outer portion of the support wire member is severed at a point adjacent to the end of the pinch seal.

BACKGROUND OF THE INVENTION

Field of the invention

The invention relates generally to electric incandescent lamps, and more particularly to lamps of the single-ended type comprising an envelope of fused silica having a pair of lead-in wires including thin foil sections hermetically sealed in said pinch seal and connected to a coiled filament in said bulb which may have a metallic reflector located adjacent thereto. Still more particularly, the invention relates to supplemental support means for supporting the filament or the reflector or both, and to the manufacture of the lamp with such support means.

Description of the prior art

In some single-ended lamps of the type described, support for the filament at its midpoint has been provided by fusing a quartz bridge across the inner lead wires within the lamp envelope and adjacent to the pinch seal, and also embedding in said bridge an end of a support wire which extends to and engages the filament at its midpoint. It has also been suggested to fasten one end of a support wire to the filament and let it hang down between the lead wires to a point where its other end will be embedded in the pinch seal. It has also been proposed to attach one end of a support wire to a filament and cause the other end to be embedded in a sealed exhaust tip at the end of the filament opposite the pinch seal. Such constructions have disadvantages such as relatively high cost, difficulty of assembly and inaccuracies in location of the supporting element.

SUMMARY OF THE INVENTION

In accordance with the invention, the support member for the filament, or for an internal reflector, or both, is a part or continuation of a supplemental wire support member which includes a thin foil portion for the purpose of making a hermetic seal with the pinch seal, and which further includes a rigid outer wire portion which extends through the pinch seal to the exterior thereof. During assembly of the lamp, the said rigid outer wire portion of the support member is securely held in position, along with the lead-in wires to the filament, while a portion of the lamp envelope is fused and pinched around the foil portions of both the lead-in wires and the support wire member to embed and anchor the foils and adjacent portions of the lead-in wires and support member, whereby to firmly and accurately support the filament or reflector or both. The outer wire portion of the support member is then severed at a point adjacent the outer end of the pinch seal.

Further features and advantages of the invention will appear from the following detailed description of species thereof and from the drawings.

BRIEF DESCRIPTION OF THE DRAWINGS

In the drawings:

FIG. 6 is an exploded elevation, on an enlarged scale, of parts of another species of filament and support assembly;

FIG. 7 is a front elevation of a completed lamp containing the filament and support construction of FIG. 6 and also including a reflector;

FIG. 8 is a side elevation of the lamp shown in FIG. 7;

FIG. 9 is a top view showing the arrangement of filament and support structure of FIGS. 6 to 8;

FIG. 10 is a front elevation of a lamp having a modified form of filament and a reflector, where only the reflector is supported in accordance with the invention;

FIG. 11 is a side view of the reflector and support assembly of the FIG. 10 lamp;

FIG. 12 is a front elevation of a lamp like that of FIG. 10 but wherein the filament and reflector are both supported in accordance with the invention; and FIG. 13 is a side elevation showing the reflector and filament, and the support assembly therefor, of the FIG. 12 lamp.

DESCRIPTION OF THE PREFERRED EMBODIMENTS

Figure 1:
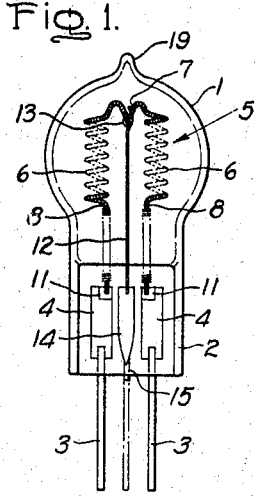
FIG. 1 is a front elevation of a lamp embodying a filament support structure according to the invention.
Figure 2:
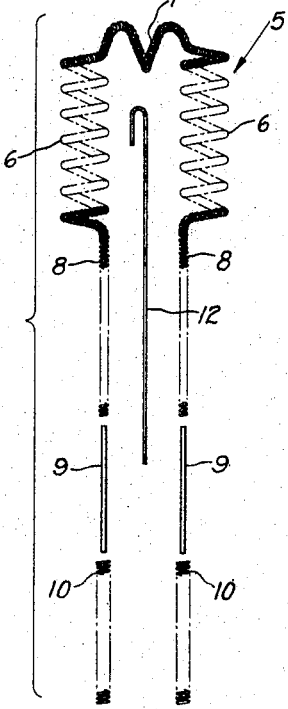
FIG. 2 is an exploded elevation, on an enlarged scale, of the filament and portions of support and lead-in conductor assemblies.

Referring to FIG. 1 of the drawing, the lamp illustrated therein is of a high intensity regenerative cycle type comprising a compact bulb or envelope 1 of vitreous material of high melting point, preferably essentially fused silica or quartz glass, having at one end thereof a flattened pinch seal 2 which may be of known I-shaped cross section and into which extend a pair of lead-in conductors comprising outer lead wire portions 3, preferably of molybdenum, welded to thin foil portions 4, preferably also of molybdenum, and hermetically sealed in the pinch seal 2. The envelope 1 contains a filament 5, preferably of tungsten which, as herein illustrated, comprises a pair of helically coiled-coil body sections or segments 6 which extend generally longitudinally of the envelope 1 in side-by-side relation and are interconnected at the top by an integral V-shaped bight portion 7. The lower ends of the coiled-coil body portions 6 terminate in longitudinally extending helically single-coiled legs 8 (FIG. 2) into the lower ends of which are inserted tungsten wire spuds 9

Figure 3:
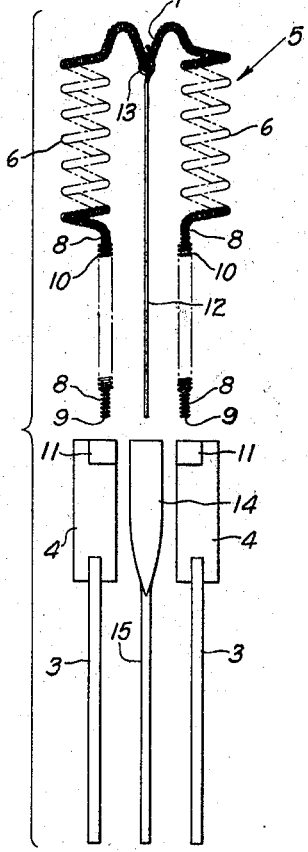
FIG. 3 is an exploded elevation showing the parts of FIG. 2 in assembled relationship, and also showing remaining portions of the support and lead-in conductor assemblies.

(FIG. 2), and the lower terminal ends of legs 8 and spuds 9 are welded to the foils 4 whereby said spuds 9 and legs 8 serve an inner lead wire portions of the composite lead-in conductors which also include the intermediate foil portions 4 and outer lead wire portions 3. The filament legs 8 are also preferably provided with close fitting slip-over helical coils 10 of tungsten wire which preferably extend along the legs 8 beyond the spuds 9 in the direction of the coiled-coil body portions 6. In accordance with known practice, the weld between each foil 4 and its inner lead portion 8, 9 is improved by preferably interposing therebetween a tab 11 (FIG. 3) of suitable metal such as platinum, or molybdenum coated with platinum.

The envelope 1 also contains a filling of inert gas such as nitrogen, argon, krypton, xenon or mixtures thereof, and a quantity of halogen such as iodine or a bromine compound such as hydrogen bromide or a hydrocarbon of bromine, which functions in known manner as a regenerative getter to return vaporized tungsten to the filament and thereby prevent blackening of the small envelope.

The filament 5 is supported at its upper end by a support wire 12, preferably of tungsten, which has a loop 13 at its upper end enclosing the filament at its intermediate bight portion 7 and which extends longitudinally of the envelope 1 into the pinch seal 2. In accordance with the invention, the support wire 12 is the inner support portion of a composite supplemental metal support member which also includes a thin foil intermediate portion 14 and an outer rigid wire portion 15. The said outer wire portion 15 extends through and terminates at the end surface of the pinch seal 2 after removal, by severing, of an original extension thereof shown in broken lines in FIG. 1, and shown in original form in FIGS. 3 and 4, as explained hereinafter. The foil portion 14 is preferably formed as an integral part of a molybdenum wire 3 by a rolling operation as disclosed in Patent 2,667,595— Noel et al., although a separate thin foil, like foils 4, may be used if desired by increasing the spacing between the power lead wires 3.

In assembling the lamp, the filament assembly is first formed by inserting the spuds 9 (FIG. 2) into respective legs 8 of the filament 5, and then slipping the supplemental helical coils 10 over the said legs 8. The upper end of the support wire 12 is looped about bight portion 7 of the filament.

The filament mount assembly is completed by welding the lower ends of the filament legs 8 and the enclosed spuds 9 to respective foils 4 (FIG. 3), and also welding the lower end of support wire 12 to foil 14. These welding operations are preferably performed with the outer lead portions 3 and outer wire support portion 15 held in elongated holes or bores in a suitable holder 16 (FIG. 4) in which they may be securely held by any suitable arrangement, as illustrated by the screws 17 for respective leads 3, and screw 18 (FIG. 5) for support wire 15. In the course of this welding operation, the filament 5 may be stretched slightly, so that upon completion of the welding, the lead wires 3, 3 and the support member 15, 14, 12 will be so adjusted longitudinally as to retain the turns of the coiled-coil body portions 6 of the filament 5 in their stretched condition.

Figure 4:
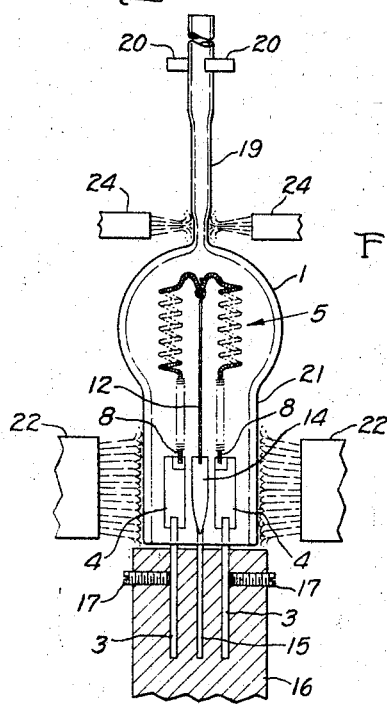
FIG. 4 is a somewhat schematic front elevation showing the assembled filament mount structure and the lamp envelope in sealing relation thereto but with the sealing fires displaced 90°.

As also shown in FIG. 4, the filament mount is then enclosed in a bulb or envelope 1 having a tubulation 19 extending upwardly therefrom and held by a pair of jaws indicated at 20. The bulb 1 also has a cylindrical neck portion 21 which encloses the foils 4, 4, 14 and adjacent portions of the outer leads 3, 3 and inner leads 8, 9 and outer and inner support wires 15 and 12. The said neck portion 21 of the envelope is then heated to a plastic condition by flames from burners indicated at 22, 22, and pinched by a pair of jaws indicated at 23, 23 (FIG. 5) to form the flattened pinch seal 2 (FIGS. 1 and 5) in which the foils 4, 4, 14 are hermetically sealed, and the aforesaid adjacent portions of the lead wires and support wires are firmly embedded and anchored. It will be understood that the relatively heavy wires 3, 3, 15, as well as support wire 12, do not make a hermetic seal with the fused silica of the pinch seal 2.

Figure 5:
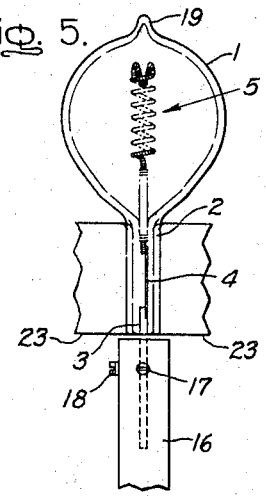
FIG. 5 is a side elevation of the sealed lamp.

The envelope 1 is then exhausted or purged of air and filled in known manner with the final fill gas and halogen, and the exhaust tube 19 is sealed or tipped off by burners indicated at 24 (FIG. 4) to leave a tip as shown in FIGS. 1 and 5. By way of example only, the lamp may be made to have a rating of some 650 watts at 220 volts in an envelope 1 of quartz glass or Vycor of approximately spherical shape having a diameter of approximately ⅞ inch, and containing, for example, about 800 torr of nitrogen with some .5 to 2% by volume of hydrogen bromide.

In FIG. 6 there is shown a different species of filament and inner support assembly. Corresponding parts are numbered the same as in FIGS. 1 to 6 with the addition of the letter a. In this case, the filament is in the form of physically separate coiled-coil sections or segments 6a each having upper and lower single-coiled legs 7a and 8a which extend longitudinally therefrom. The legs 7a and 8a of each section are preferably in longitudinal alignment and extend from the edges of cylinders defined by the coiled-coil body portion of the segment 6a. The support member 12a is preferably of a generally double-J shape formed from a single length of wire, preferably tungsten, which is doubled back upon itself and has its free ends formed as hooks 13a which extend in opposite directions to be in a common plane.

As described in connection with the lamp of FIGS. 1 to 5, the filament assembly also includes tungsten wire spuds 9a and slip-over coils 10a which are inserted, respectively, into the interior of and over the exterior of the lower filament legs 8a. The upper filament legs 7a are threaded or fitted over respective hooks 13a which serve as supporting mandrels therefor, as illustrated in FIGS. 7 and 9. Similarly, the filament mount assembly is completed by welding the lower ends of the filament legs 8a and the enclosed spuds 9a to respective foils 4a (FIG. 7), and also welding the lower end of support wire member 12a to foil 14a. These welding operations are preferably performed with the outer lead portions 3a and outer wire support portion 15a held in the holder 16 of FIG. 4. Likewise, as described in connection with FIG. 4, the mount is sealed in the bulb 1a with the foils 4a, 4a, 14a hermetically sealed in the pinch seal 2a, and adjacent portions of the inner leads or legs 8a and inner support wire portion 12a are embedded and anchored in said pinch seal. The bulb 1a is then filled with the desired inert gas and halogen, and is tipped off at 19a. Also, the outer support wire portion 15a is severed at a point close to the end of the pinch seal 2a.

As illustrated in FIGS. 7 and 8, the lamp may, if desired, be provided with a reflector 25 of thin sheet refractory metal, such as molybdenum, in close proximity to the filament 6a. The said reflector 25 is supported by a wire or a strip 26 which is preferably an integral extension of the reflector metal and which is welded to the foil 14a along with the filament support wire member 12a so that its lower end is also anchored in the pinch seal 2a. The reflector may be of any desired shape; as illustrated, it is of rectangular outline with a major portion thereof formed to a pie plate shape. Being in close proximity to the filament 6a, the thin reflector 25 is heated to a high temperature during lamp operation with no significant adverse effect upon operation of the halogen regenerative cycle.

The lamp shown in FIGS. 10 and 11 differs from those of FIGS. 1 and 7 mainly in that the coiled-coil filament 5b extends transversely of the axis of the envelope 1b and is not provided with a supplemental support, only the concave sheet metal reflector 25b being supported by a preferably integral strip portion 26b, the lower end of which is welded to the foil support portion 14b and embedded in the pinch seal 2b. The reflector 25b is preferably additionally positioned by a second strip portion 27 at its upper end which extends into the cavity formed by the exhaust tip 19b. It is preferred that the said strip 27 not be sealed or embedded in the fused exhaust tip 19b, alhtough it may be so sealed or embedded if desired. Parts corresponding to those in FIGS. 1 and 7 carry the same material with the addition of the letter b.

The lamp shown in FIGS. 12 and 13 is like that shown in FIGS. 10 and 11 except that the filament 5c is provided with a supplemental support which may consist of a support wire 12c which has its lower end welded to coil portion 14c, along with the reflector-supporting strip 26c. Alternatively, the filament may be supported by a wire 28 which has one end welded or mechanically joined to the strip 27c which projects from reflector 25c. Otherwise the lamp parts correspond to those of the lamp shown in FIG. 10 (as well as those of FIGS. 1 and 7) and are similarly numbered except for the addition of the letter c to the corresponding numeral.

What I claim as new and desire to secure by Letters Patent of the United States is:

1. In an electric incandescent lamp of the single-ended, compact regenerative cycle type comprising a sealed envelope of essentially fused silica containing an inert gas filling and a quantity of halogen serving as a regenerative getter, a flattened pinch seal at one end of said envelope, a pair of lead-in conductors comprising rigid outer lead wire portions which extend into said pinch seal from the exterior thereof and are connected to thin foil intermediate lead portions hermetically sealed in said pinch seal in spaced side-by-side relation and to which are connected inner lead portions which extend from said pinch seal into said envelope, a tungsten wire filament member in said envelope connected at its ends to said inner lead portions, a sheet metal reflector member in said envelope adjacent said filament, a supplemental metal support member including a thin foil portion hermetically sealed in said pinch seal between and spaced from said foil intermediate lead portions and having a rigid outer wire portion extending through and terminating at the exterior surface of said pinch seal and further including an inner support portion having one end connected to said foil portion and embedded in said pinch seal and having its other end connected to the supporting at least one of said filament and reflector members.

2. In a lamp as set forth in claim 1, said inner support portion supports both said filament member and said reflector member.

3. In a lamp as set forth in claim 1, said support portion supports only said reflector member.

4. In a lamp as set forth in claim 3, wherein an additional support extends from said reflector into a cavity in the envelope opposite the pinch seal.

5. In an electric incandescent lamp of the single-ended, compact regenerative cycle type comprising a sealed envelope of essentially fused silica containinig an inert gas filling and a quantity of halogen serving as a regenerative getter, a flattened pinch seal at one end of said envelope, a pair of lead-in conductors comprising rigid outer lead wire portions which extend into said pinch seal from the exterior thereof and are connected to thin foil intermediate lead portions hermetically sealed in said pinch seal in spaced side-by-side relation and to which are connected inner lead portions which extend from said pinch seal into said envelope, a tungsten wire filament member in said envelope connected at its ends to said inner lead portions, a supplemental metal support member including a thin foil portion hermetically sealed in said pinch seal between and spaced from said foil intermediate lead portions and having a rigid outer wire portion extending through and terminating at the exterior surface of said pinch seal and further including an inner support portion having one end connected to said foil portion and embedded in said pinch seal and having its other end connected to an supporting said filament at a point intermediate its ends.

6. In a lamp as set forth in claim 5, wherein the inner support portion of said supplemental support member comprises an elongated stem portion having one end connected to said foil portion of said support member and extending longitudinally into said envelope where it terminates in opposed hooks, and the filament member is composed of physically separate helically coiled sections extending longitudinally of the envelope at opposite sides of said stem portion of the support member with one proximate pair of ends connected to respective inner lead portions of the lead-in conductors, the opposite proximate pair of ends of the filament being threaded firmly over respective said hooks as supporting mandrels therefor.

7. The method of manufacture of an electric incandescent lamp which comprises the steps of forming a mount structure including a pair of lead-in conductors arranged in parallel spaced relationship and comprising rigid outer lead wire portions which are connected to thin foil intermediate lead portions to which are connected inner lead portions to which are connected the ends of a coiled filament, and a supplemental metal support member located between and spaced from said lead-in conductors and including a thin foil portion located between the foil intermediate lead portions and having a rigid outer wire portion located between and generally coextensive with said outer lead portions and further including an inner support portion having one end connected to said foil portion of the support member and its other end connected to and supporting the filament at a point intermediate its ends, supporting the mount structure by gripping the outer lead wire portions and the outer wire portion of the support member, enclosing the filament in an envelope of essentially fused silica having a neck portion enclosing the several said foil portions and adjacent portions of the lead-in conductors and support member, heating the said neck portion to a plastic condition and then compressing it to form a pinch seal hemetically sealing the several said foil portions and anchoring the said adjacent portions of the lead-in conductors and support member, and then severing the outer wire portion of the support member at a point adjacent to the outer end surface of the pinch seal.

8. The method set forth in claim 7 wherein the filament is composed of coiled segments extending generally longitudinally into the interior of the envelope with outer proximate ends connected to respective inner lead portions and inner proximate ends interconnected, and the inner support portion of said supplemental support member extending longitudinally between said filament coiled segments and connected to the interconnected inner proximate ends of the filament segments as a support therefor, and wherein the step of supporting the mount structure includes stretching the coiled filament segments and an adjustment of the supplemental support member relative to an longitudinally of the lead-in conductors in a direction to hold the coiled filament segments in the stretched condition, and maintaining such adjusted position during formation and completion of the pinch seal.

References Cited

UNITED STATES PATENTS 3,194,999  7/1965  Heinlein _____ 313—273 X
3,270,238  8/1966  Mosby _____ 313—279

JAMES W. LAWRENCE, Primary Examiner.

R. F. HOSSFELD, Assistant Examiner.

U.S. Cl. X.R.

313—174, 222, 271, 273, 279